Patented May 25, 1948

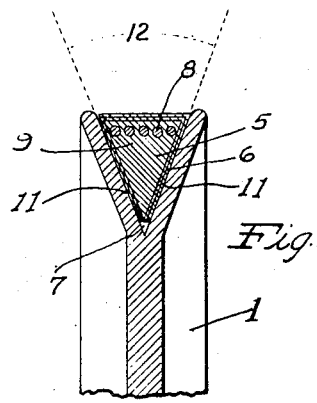
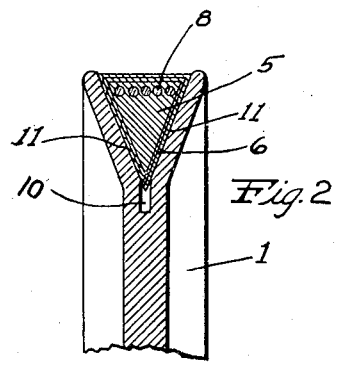
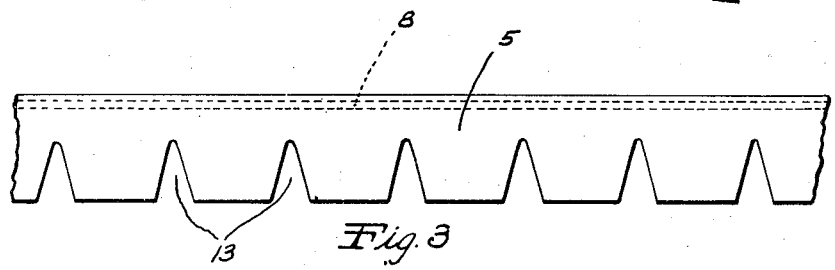
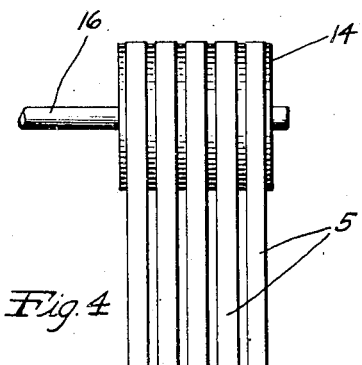
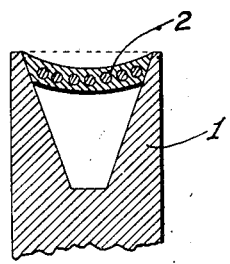
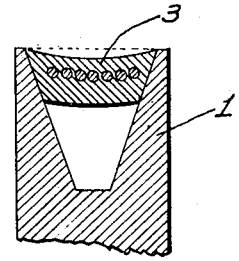
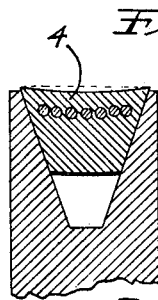
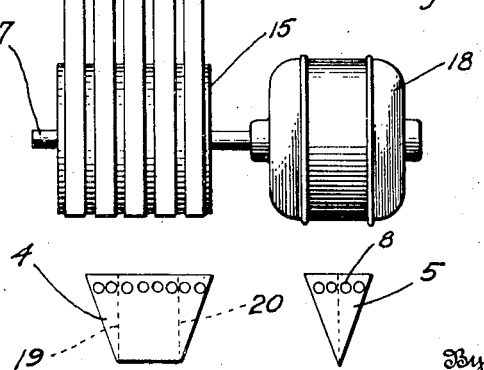
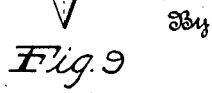

2,442,037

UNITED STATES PATENT OFFICE 2,442,037

WEDGE BELT

Raymond S. Carter, Cuyahoga Falls, and Marvin L. Dorf, Akron, Ohio, assignors to Wingfoot Corporation, Akron, Ohio, a corporation of Delaware Application April 19, 1945, Serial No. 589,186

9 Claims. (Cl. 74—233)

The present invention relates to V belts used for single or multiple drives and has for its primary object an improvement in V belts to increase the life, reduce the cost of manufacture and to reduce the heating effect during operation. Specifically, this invention relates to V belts of the type in which relatively inextensible reinforcing cords or wires are used to prevent stretching of the belt to thus maintain proper driving relation between the faces of the belt and the faces of the sheaves with which the belt is used.

Another object of this invention is to maintain the reinforcing cords or wires in proper transverse alignment in the belt to eliminate radial shifting movement thereof under stressed conditions, thereby reducing the amount of internal friction set up in the belt for reasons which will appear later. By maintaining the inextensible elements in proper alignment within the belt, the heating effect is greatly reduced and the belt runs cool. This latter term is a relative term and does not imply that no heat is generated, but tests have demonstrated that in use a belt constructed according to this invention will not generate nearly as much heat as the conventional type belt provided with reinforcing inextensible elements. For example, standard V belts now used to carry the same load as a belt constructed according to this invention, when tested in a testing machine, generates so much heat, mainly from internal friction, that the belt becomes sufficiently hot to sear the flesh, whereas, a belt constructed according to this invention and tested in the same manner under the same conditions will remain sufficiently cool to permit it to be grasped by one's hand without searing the flesh.

Naturally, the cooler a belt runs, the longer will be its life for heat has a serious detrimental effect on the life of rubber or rubber compounds.

Belts constructed according to the present invention are so constructed that the components thereof maintain a relatively neutral position with respect to other component parts thereof to reduce internal friction between particles of the belt, thereby eliminating the greatest source of heating effect in the belt.

In the drawings:

Figure 1 is a cross-sectional view through a sheave and belt, the latter being constructed according to this invention;

Figure 2 is a similar view to that shown in Figure 1, illustrating a modification of this invention;

Figure 3 is a side elevation of the belt;

Figure 4 is a plan view showing this invention applied to a multiple V belt drive; and Figures 5, 6 and 7 are cross-sectional views similar to Figure 1, designed to illustrate the novelty of this invention by illustrating the action of normal types of V belts now in use.

Figures 8 and 9 illustrate diagrammatically a feature of this invention.

In V belts it has been customary to incorporate therein inextensible elements extending longitudinally thereof to prevent elongation of the belt, whereby proper driving engagement may be maintained between the belt and the sheaves upon which it is mounted. If these inextensible cords are not supported radially, they tend to move inwardly toward the bottom of the groove in the sheave, thus relieving some of the tension in the inextensible elements and requiring the other inextensible elements to take up additional loads with the net result that in the ordinary V belt drive the major portion of the load is placed on the outer inextensible elements while the inner inextensible elements (those toward the center of the belt) are relatively free from the load. The increased load on the outer elements will cause premature failure of the belt. It is, therefore, a primary object of this invention to support radially all of these inextensible elements whereby the load is evenly distributed over all instead of a few.

In Figures 5, 6 and 7, there is illustrated V belts of different thicknesses and normally, when these belts are not stressed, the upper and lower faces thereof are flat as illustrated by the dotted lines in these figures. In these figures the same reference characters refer to similar parts throughout and except for the amount of distortion similar results are obtained for each thickness of belt.

Throughout the drawings the reference character 1 illustrates either a driving or driven sheave; 2 indicates a relatively thin V belt; 3 indicates a thicker V belt; and 4 a still thicker V belt and one which is comparable to those used commercially in drives of this character. In all these constructions it will be noted that the width of the belt at its widest portion is greater than the thickness. Inextensible reinforcing elements, such as inextensible cords or wires, are generally arranged within the belt in single or multiple rows extending the length of the belt so that in cross-section they appear as illustrated in Figures 5, 6 and 7. Normally, before a tension is placed on the belt, the upper and lower faces thereof are flat as illustrated by dotted lines in these figures, but under load conditions or when the belt is tensioned, the central portions of the belt tend to sag as clearly illustrated by the full lines in Figures 5, 6 and 7 with the result that the cords near the outer edges take up most of the load and, therefore, have greater stresses therein than the intermediate cords. Also, during fluctuation in the driving requirements, this sag varies, depending upon the load, and the net result is that the constant inward and outward movement of the central part of the belt generates friction between the particles in the belt and between the inextensible elements and surrounding rubber or rubber composition all of which tends to heat up the material and decrease the life of the belt.

In order to eliminate this sagging effect this invention contemplates forming the driving faces so that they meet and thus form a true V. However, due to the fact that a true V belt will "bottom," that is, hit the bottom of the groove in the sheave, it is necessary in order to make a practical application of the principles involved to eliminate a relatively small portion of the belt at the inner periphery so that under the driving strain the belt will not "bottom" in the groove or provide clearance in the sheave itself as will be pointed out later.

Figure 1 shows the improved belt 5, the body of which is preferably encompassed only on three sides by the cover member 6 which cover may be a single layer of cross-woven fabric, a plurality of layers of similar material or several layers of bias-cut fabric laid at opposite angles to each other. By this arrangement, it is unnecessary to lap the ends of the fabric and the inner face 7 does not require any fabric covering although it could be covered if desired.

The belt is formed with the inside out on a drum or former. The fabric is first laid over the drum, the inextensible reinforcing elements 8 are then wound around the fabric, the rubber body portion 9, made substantially to required size and shape, is then laid over the inextensible reinforcing elements 8, and the free edges of the fabric cover are then brought up along the sides of the body portion. The belt is then vulcanized in a mold, removed from the mold, and then turned right side out, or the belt can be thus formed in a mold section just prior to the molding operation with the rubber being injected into the space between the side portions of the cover in the manner clearly described in the application of Raymond S. Carter, et al., Serial No. 519,448, filed January 24, 1944.

In Figure 2 is illustrated a similar and preferred construction for a V belt in which the side faces of the belt meet at a point or line to form a true V in which case a groove 10, about 1/16" in width, is formed at the bottom of the normal V shaped groove provided in the sheave to give the necessary clearance.

The amount of material to be removed from the inner apex portion of the belt is relatively slight and is somewhat exaggerated in Figure 1. For practical purposes it is only necessary to remove an amount which is not over 10 to 15% of the thickness of the belt. Of course, in making a belt such as in Figure 1, the belt is not generally formed with an apex at all, but is initially molded to the shape shown in that figure. It will be noted that driving faces 11 on the sheave form an angle 12 which is approximately not over 45°. In belts of this character, it has been found that the most satisfactory results are obtained by making this angle not materially greater than 45°.

In operation the belt under tension will have little of the sagging effect illustrated in Figures 5, 6 and 7 due to the fact that practically all of the cords receive radial support from the material in the belt due to the fact that the material is in turn substantially entirely given a similar radial support by the driving faces 11. The face 7 is so small that due to the natural crowding of the rubber at this point inwardly by the driving faces, even the central portion of the belt has little tendency to move inwardly in a radial direction and thus the cords are well supported and will not move inwardly to cause the sagging effect previously referred to. Since there is no appreciable sagging effect in the belt, there is little relative friction due to the driving strains between the inextensible elements and the surrounding portions of the belt or between other portions of the belt, thereby eliminating the internal friction which is a serious defect in belts of this character. Furthermore, the driving strain is uniformly distributed due to the fact that all cords become tensioned to substantially the same extent.

The driving strain is principally taken up by the inextensible elements and the remaining portions of the belt are there to maintain the elements in juxtaposition and to give lateral stiffness to the belt and radial support for the inextensible elements. It is, therefore, possible to make the belt more flexible longitudinally by providing the notches 13 shown in Figure 3 and these may extend 50 to 75% of the thickness of the belt without materially lessening the support given to the inextensible elements 8. I do not wish to limit this invention to providing a belt with notches such as 13 as the belt will operate satisfactorily without these notches, but the notches do permit the belt to flex around the sheaves in a more satisfactory manner. By cutting the notches real deep the tensioned section of the belt represents the equivalent of a thin flat belt with the somewhat pyramidal projections on the inside to give radial support.

There is another disadvantage of belts constructed such as shown in Figures 5, 6 and 7, namely, that due to the fact that the sag increases or decreases according to the load, the amount of radial movement of the center part of the belt will fluctuate greatly, thus preventing a smooth driving engagement between the belt and the sheaves. Since a belt made according to this invention maintains its cross-sectional shape at all times due to the radial support given to all of the inextensible cords, the belt is able to perform its function without much vibration, thereby improving the drive and lengthening the life of the belt.

In Figure 4 this belt is shown in what is known as a multiple V belt drive which comprises two sheaves 14 and 15 mounted on shafts 16 and 17, respectively, the latter being driven by a motor 18. These multiple drives are common in the art and it will be apparent from inspection of the plan view in Figure 4 that any reduction in the width of the sheaves 14 and 15 will effect not only a saving in weight of material, but will also effect a saving in cost and a saving in the amount of space required. It has been found that with this invention the width of the belt can be materially reduced. In other words, in the forms of the invention shown in Figures 5, 6 and 7, the center portions of the belts do very little work and may just as well be eliminated.

In Figures 8 and 9 is illustrated what has been discussed in the previous paragraph. In Figure 8 there is shown a belt such as 4 in Figure 7, and in Figure 9 there is shown a belt such as 5 in Figure 1. The belt shown in Figure 8 can be used to drive a given load but, as already explained, the cords in the section of the belt confined between the upper and lower surfaces of the belt and the dotted lines 19 and 20 (Figure 8) do not perform much if any work and this section can, therefore, be eliminated to produce a belt such as shown in Figure 9. This belt in Figure 9 will perform by actual test substantially the same amount of work as performed by the belt shown in Figure 8 with approximately ⅓ to ¼ of the material used in the belt shown in Figure 8. This is not merely conjecture but has been proven by actual tests.

Summing up, it will be obvious that this invention results in a considerable saving of material, a great reduction in the heating effect of the belt and as a result increases the life of the belt, maintains proper driving contact without much appreciable vibration and imparts a uniform distribution of the load to the inextensible elements. It effects a great saving in space, especially when used with multiple V belt drives, and reduces the weight and cost of sheaves employed with this invention. In all, there is a great saving made without a reduction in the amount of work that can be done by the belt itself.

The material of these belts is subjected to a massaging action as it is squeezed in the groove. This causes the material to flow in the direction of least resistance and this is quite pronounced, especially with synthetic rubber. Thus, in Figures 5, 6 and 7 the material tends to move or flow inwardly causing a permanent reduction in the width. This necessitates frequent adjustment of the belt drive to maintain the required tension. With this invention, due to the lesser heating effect and greater support for the material, there is little flow of the material and adjustment is seldom necessary.

Having thus fully described this invention, what we claim and desire to claim by Letters Patent of the United States is:

1. A wedge type driving belt comprising an endless body portion substantially triangular in cross-section, providing three principal faces exteriorly thereof, two of said faces acting as driving faces for engaging similarly disposed driving faces on a sheave having a V-shaped groove therein, the other of said faces comprising a base portion of less width between the edges of the effective driving faces near the base portion than the distance between the upper and lower edges of the effective driving faces measured perpendicular to said base portion, said body portion including a single row of peripherally extending and laterally aligned substantially inextensible load carrying elements imbedded in the body near and substantially parallel to said base portion and between the driving faces, the driving faces converging toward each other in a direction away from the base portion and toward a line of convergence and extending at least substantially 85% of the distance toward that line of convergence, and the load carrying elements extending substantially the full width of the belt at the base portion.

2. A wedge type driving belt comprising an endless body portion substantially triangular in cross-section, providing three principal faces exteriorly thereof, two of said faces acting as driving faces for engaging similarly disposed driving faces on a sheave having a V-shaped groove therein, the other of said faces comprising a base portion of less width between the edges of the effective driving faces near the base portion than the distance between the upper and lower edges of the effective driving faces measured perpendicular to said base portion, said body portion including a narrow band of peripherally extending and laterally aligned substantially inextensible load carrying elements imbedded in the body near and substantially parallel to said base portion and between the driving faces, the driving faces substantially joining each other along the edges thereof opposite said base portion, and substantially all of the load carrying elements being arranged so as to be substantially entirely directly over the driving surfaces measured perpendicular to the base portion.

3. A wedge type driving belt comprising an endless body portion substantially triangular in cross-section, providing three principal faces exteriorly thereof, two of said faces acting as driving faces for engaging similarly disposed driving faces on a sheave having a V-shaped groove therein, the other of said faces comprising a base portion of less width between the edges of the effective driving faces near the base portion than the distance between the upper and lower edges of the effective driving faces measured perpendicular to said base portion, said body portion including a narrow band of peripherally extending and laterally aligned substantially inextensible load carrying elements imbedded in the body near and substantially parallel to said base portion and between the driving faces and extending substantially the full width of the base portion, the driving faces extended, intersecting along a line beyond the body of the belt at a distance not over 15% of the vertical distance from said base portion to said line of intersection whereby to leave a truncated portion substantially parallel to said base portion.

4. A wedge type driving belt comprising an endless body portion substantially triangular in cross-section, providing three principal faces exteriorly thereof, two of said faces acting as driving faces for engaging similarly disposed driving faces on a sheave having a V-shaped groove therein, the other of said faces comprising a base portion of less width between the edges of the effective driving faces near the base portion than the distance between the upper and lower edges of the effective driving faces measured perpendicular to said base portion, said body portion including a narrow band of peripherally extending and laterally aligned substantially inextensible load carrying elements imbedded in a body of yieldable rubber near and substantially parallel to said base portion and between the aforesaid driving faces, the driving faces substantially joining each other along the edges thereof opposite said base portion and the said elements being substantially uniformly spaced throughout the width of the belt.

5. A wedge type driving belt comprising an endless body portion substantially triangular in cross-section, providing three principal faces exteriorly thereof, two of said faces acting as driving faces for engaging similarly disposed driving faces on a sheave having a V-shaped groove therein, the other of said faces comprising a base portion of less width between the edges of the effective driving faces near the base portion than the distance between the upper and lower edges of the effective driving faces measured perpendicular to said base portion, said body portion including a single row of peripherally extending and laterally aligned substantially inextensible load carrying elements imbedded in a body of yieldable rubber near and substantially parallel to said base portion and between the aforesaid driving faces, the driving faces converging toward each other in a direction away from the base portion and toward a line of convergence and extending at least substantially 85% of the distance toward that line of convergence and the said elements being substantially uniformly spaced throughout the width of the belt.

6. A belt as set forth in claim 2 in which the edge of the belt opposite the base portion is notched with a series of notches extending parallel to said base portion to a depth of more than 50 per cent of the thickness of the belt measured along a perpendicular to said base portion.

7. A belt as set forth in claim 2 in which the driving faces form an angle of approximately not over 45° with each other.

8. A wedge type driving belt comprising an endless body portion substantially triangular in cross-section, providing three principal faces exteriorly thereof, two of said faces acting as driving faces for engaging similarly disposed driving faces on a sheave having a V-shaped groove therein, the other of said faces comprising a base portion of less width between the edges of the effective driving faces near the base portion than the distance between the upper and lower edges of the effective driving faces measured perpendicular to said base portion, said body portion including a peripherally extending substantially inextensible narrow band arranged with its broad side substantially parallel to and adjacent said base portions and extending substantially the width of the belt, the driving faces converging towards each other in a direction away from the base portion toward a line of convergence and extending at least substantially 85% of the distance toward that line of convergence, whereby said band is substantially entirely supported directly over the driving surfaces measured perpendicular to the base portion.

9. A wedge type driving belt comprising an endless body portion substantially triangular in cross-section, providing three principal faces exteriorly thereof, two of said faces acting as driving faces for engaging similarly disposed driving faces on a sheave having a V-shaped groove therein, the other of said faces comprising a base portion of less width between the edges of the effective driving faces near the base portion than the distance between the upper and lower edges of the effective driving faces measured perpendicular to said base portion, said body portion including a narrow band of peripherally extending and laterally aligned substantially inextensible load carrying elements imbedded in the body near and substantially parallel to said base portion and between the driving faces, the driving faces converging towards each other in a direction away from the base portion toward a line of convergence and extending at least substantially 85% of the distance toward that line of convergence, and substantially all of the load carrying elements being arranged so as to be substantially entirely directly over the driving surfaces measured perpendicular to the base portion.

RAYMOND S. CARTER.
MARVIN L. DORF.

REFERENCES CITED

The following references are of record in the file of this patent:

UNITED STATES PATENTS

| Number | Name | Date |
|---|---|---|
| 585,416 | Wattlee | June 29, 1897 |
| 811,794 | Riddell | Feb. 6, 1906 |
| 1,185,336 | Lynn | May 30, 1916 |
| 1,537,075 | Freedlander et al. | May 12, 1925 |
| 1,890,082 | Freedlander | Dec. 6, 1932 |
| 2,029,381 | Merrill et al. | Feb. 4, 1936 |
| 2,167,384 | Freedlander | July 25, 1939 |
| 2,211,202 | Freedlander | Aug. 13, 1940 |
| 2,347,798 | Reiling | May 2, 1944 |
| 2,356,249 | Kremet et al. | Aug. 22, 1944 |